April 10, 1934.  D. T. BROWNLEE  1,954,614
TWO-WAY CLUTCH AND CONTROLLING MECHANISM
Filed Dec. 18, 1929   2 Sheets-Sheet 1
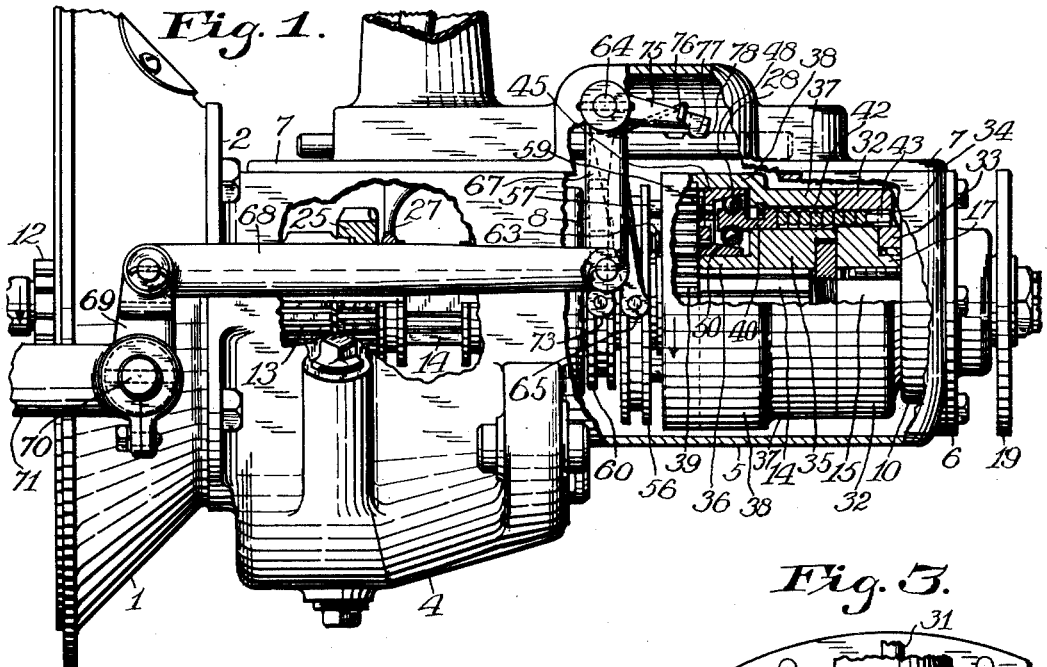
INVENTOR:
Dalmar T. Brownlee,
BY
E. T. Silvius,
ATTORNEY.

April 10, 1934.  D. T. BROWNLEE  1,954,614
TWO-WAY CLUTCH AND CONTROLLING MECHANISM
Filed Dec. 18, 1929    2 Sheets-Sheet 2
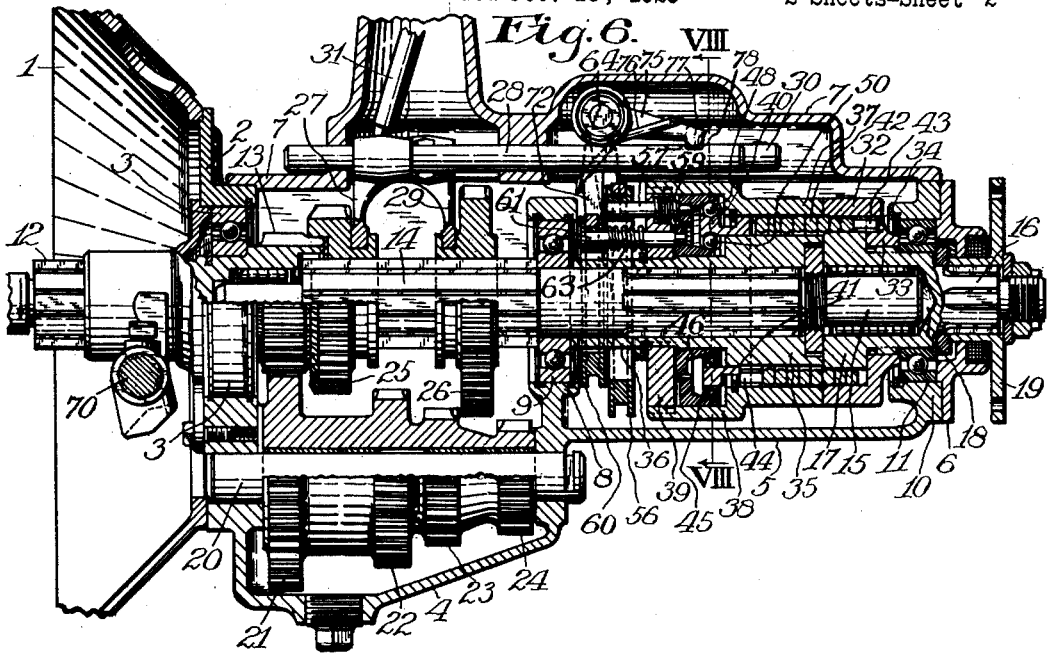
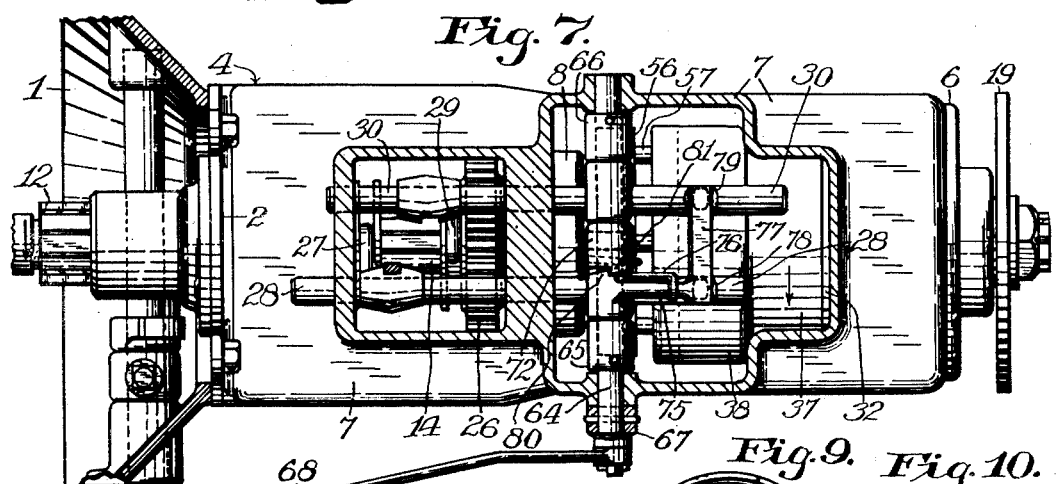
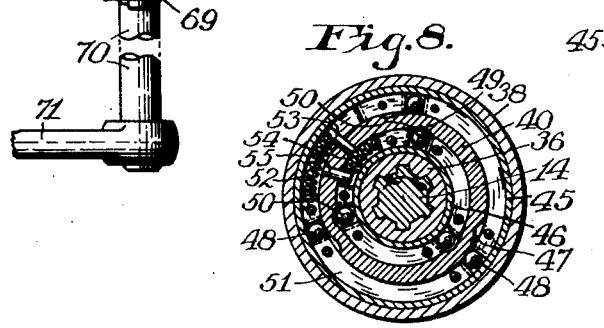
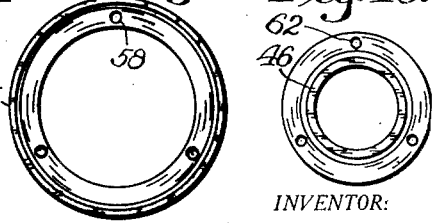
INVENTOR:
Dalmar T. Brownlee,
BY E. T. Silvius.
ATTORNEY.

Patented Apr. 10, 1934

1,954,614

UNITED STATES PATENT OFFICE 1,954,614

TWO-WAY CLUTCH AND CONTROLLING MECHANISM

Dalmar Templeton Brownlee, Indianapolis, Ind., assignor to L. G. S. Devices Corporation, Indianapolis, Ind., a corporation of Indiana Application December 18, 1929, Serial No. 415,044

13 Claims. (Cl. 192—48)

This invention relates to dual-action clutch mechanism that is designed to enable one of two alining shaft sections to rotate and permit the other to independently rotate in one direction; the invention having reference more particularly to motor-vehicle transmission mechanism of a type designed to be connected with and controlled in harmony with a speed changing transmission gear set.

An object of the invention is to provide a connection between a driving shaft and driving wheels that shall be of such construction as to enable the shaft to rotate the wheels in one direction and permit the driving wheels freely to rotate independently of driving shaft action.

A further object is to provide a connection in a motor-vehicle between the gear box and the axle driving mechanism that shall be so constructed as to automatically release the driving connection between such parts when the main clutch of the motor is released.

A still further object is to provide improved connecting mechanism which shall be of such construction as to enable a vehicle to be driven at high speed and to enable the vehicle to coast when sufficient speed has been attained, with the engine idling, thereby permitting a reduction of fuel consumption and consequent economy in cost of operation, while causing reduction of engine friction and wear; a particular object being to simplify control of a motor-vehicle to permit freewheel action and coasting under the power of momentum, especially when descending a moderate hill without retarding movement of the motor-vehicle; which mechanism shall be of such construction as to be made and installed at low cost and be durable and economical in use.

With the above-mentioned and other objects in view, the invention consists in novel automatically operating clutch mechanism and controlling apparatus therefor, and means for applying the same to a propulsion mechanism of a motor-vehicle; the invention consisting also further in the parts and in the combinations and arrangements of parts as hereinafter particularly described and further defined in the claims appended hereto.

Referring to the accompanying drawings,—Figure 1 is a side elevation of a motor-vehicle transmission gear set with which the invention is connected, portions being broken away to sectionally disclose other portions; Fig. 2 is a fragmentary side elevation of Fig. 1 in which various parts are in relatively different positions; Fig. 3 is a transverse sectional elevation approximately on the line III—III in Fig. 2; Fig. 4 is an elevation of a controlling device assembly separately shown more clearly than in other views; Fig. 5 is an edge view of the control device assembly; Fig. 6 is a longitudinal vertical section of the transmission gear set and the novel mechanism associated therewith; Fig. 7 is a top plan of Fig. 1 with the upper portion of the gear casing omitted; Fig. 8 is a section of the novel mechanism on the line VIII—VIII in Fig. 6; Fig. 9 is an elevation of one of the clutch controlling devices; and Fig. 10 is an elevation of another one of the clutch controlling devices.

Similar reference characters in the different figures of the drawings indicate corresponding elements or features of construction herein referred to in detail.

The invention being particularly advantageous in connection with the well-known motor-vehicle it will be particularly described in connection with the propelling machinery thereof, the numeral 1 indicating a clutch casing secured to the rearward portion of a crank case or engine base. Fixed to said casing is one end 2 of a transmission gear housing which supports a suitable bearing ring 3, the housing comprising a main portion 4 which for the purpose of the present invention has a relatively smaller housing portion 5 provided at its end with a suitable head member 6; and a suitable cover 7 is provided for the top of the housing and supports conventional shifter rods and parts of the invention. The housing has a supporting member 8 therein for a suitable bearing ring 9. The end portion of the housing preferably has a substantial end member 10 directly supporting the part 6 and also a suitable bearing ring 11. A drive shaft 12 is suitably supported in the bearing ring 3 and has a drive wheel 13 thereon that is provided with gear teeth that project rearwardly to constitute clutch teeth. A transmission shaft 14 has its forward end rotatively arranged in the wheel 13 and is suitably supported rotatively in the bearing ring 9, the shaft having a journal 15 at its end that is adapted to rotate in a bearing supported by a shaft section 16 arranged in the head member 6 and having a head portion 17 that is rotated in the bearing ring 11 and has a suitable bore 18 receiving the journal, the shaft sectiton 16 having a coupling flange 19 keyed thereon for connection with a propeller shaft.

The housing 4 supports a countershaft 20 on which gear wheels 21, 22, 23 and 24 integrally connected together are rotatably supported, operating conventionally for changing speed and reverse motion of the transmission shaft by means of shiftable gears 25 and 26 splined to the transmission shaft. The wheel 25 is provided with a shifter fork 27 and is adapted to be clutched to the wheel 13 or to be shifted into connection with the wheel 22, the fork 27 being secured to a shifter rod 28. A fork 29 is secured to a shifter rod 30 and suitably connected with the wheel 26. The forks are conventionally controlled by a shifter lever 31.

In the preferred construction of the invention the head portion 17 has an annular member 32 separately constructed and suitably larger and extending about the portion 17 and is provided with a hub 33 keyed thereto, being provided with a pocket 34. A cylindrical clutch member 35 is keyed to the transmission shaft section 14 forward of the head portion 17 and has an external contact face that is slightly less in diameter than that of the portion 17, the clutch member having an extension 36 that is relatively small in external diameter to afford clearance space. A hollow cylindrical clutch member 37 is arranged so as to surround the member 35 and be in alinement with the member 32 to form an annular channel between the two clutch members. The member 37 has a chambered base portion 38 that is secured to a web 39 which is keyed to the extension 36 of the member 35, the arrangement providing an annular chamber for controlling devices as will later appear. Said devices include a control ring 40 arranged in the chamber and extending into the space between the clutch members 35 and 37, the end having a pocket 41 therein. A coil spring clutch device 42 is loosely arranged between the inner and outer clutch members, extending tightly between the parts 17 and 32 and being provided with a lug 43 that projects into the pocket 34 for anchorage of one end of the clutch device. The opposite end of the clutch device has a lug 44 operatively engaged with the ring 40 to turn the device so as to contract it into engagement with the member 35, or in the opposite direction to expand it into contact with the clutch member 37, whereby to enable the shaft section 14 to rotate the shaft section 16. The ring 40 is provided with controlling means which preferably comprise two guide rings 45 and 46 differing in diameter and concentrically arranged in the chamber provided between the inner and outer clutch members, one extending about the ring 40 and being wedge-like in cross-section so as to have an inclined face opposite to the ring 40, the inner ring 46 being also wedge-like in cross-section so as to have an outer inclined face presented towards the ring 40. The clutch control ring 40 has inclined recesses 47 in its outer surface in which clutch balls 48 are arranged to operate in connection with the inclined portion of the ring 45 to constitute an outer controlling means by which the clutch device 42 is caused to be diametrically expanded into contact with the clutch member 37 for normally driving the shaft section head 32 for forward motion at high speed and permitting automatically unclutching when the speed of the head member 32 exceeds that of the clutch member 37. The control ring 40 is provided in its inner side with inclined recesses 49 in which clutch balls 50 are arranged to operate in connection with the inclined face of the ring 46 to cause turning of the ring 40 in the opposite direction and thereby effect diametrical contraction of the clutch device 42 onto the clutch member 35 for driving the shaft section 16 in reverse direction when the transmission shaft is rotated by the reverse gears. The clutch balls are suitably arranged in a retaining ring 51 for each series of balls. A coil spring 52 is seated at one end in the ring 51 and is supported against a stud 53 secured to the ring 40 so as to tend to dislodge the balls 48 when required to become loosened in the recesses 47. A spring 54 is arranged at the inner portion of the ring 40 against the stud 55 secured to the ring and seated appropriately in the inner retaining ring to assist in dislodging the balls 50 at the moment required. The outer guide ring is controlled by means of an annular header 56 that extends about the transmission shaft and has short guide rods 57 secured thereto that are movably guided in the web 39 and secured to the guide ring 45 which has holes 58 spaced apart and in which the ends of the rods are secured. A coil spring 59 is arranged on each of the guide rods and seated in a suitable recess in the web 39 and also against the ring 45, the spring constantly forcing the guide ring 45 against the balls 48 to effect their operation in the recesses 47, the header being retractible in opposition to the spring pressure so as to effect release of the outer guide ring. Another header 60 is arranged forward of the header 56 and is slightly larger in diameter externally than the internal diameter of the header 56. A suitable number of guide rods 61 are secured to the header 60 and are movably guided in the web 39 through which they extend and are secured to the ring 46 in spaced apart holes 62. Coil springs 63 are arranged under compression between the web 39 and the header 60 to normally cause release of the inner guide ring. Each header has a circumferential groove for control of the headers and the guide rings.

For general control of the clutch apparatus a shaft 64 is rotatively supported by the cover 7, and two shifter arms 65 and 66 are secured to the shaft and suitably connected with the header 56, and operating arm 67 being secured also to the shaft outside the cover and to which a connecting rod 68 is suitably connected. The rod 68 is in turn connected with a lever arm 69 which preferably is secured to the shaft 70 of a suitable engine clutch pedal 71, so that when the engine clutch is released the header 56 is shifted forwardly into contact with the header 60 which also is moved forward retractively, thus causing release of both the inner and outer guide rings; but other provision is made for releasing the inner guide ring when required when not in release position. A shifter fork arm 72 is loosely connected with the shaft 64 and has yoke arms 73 and 74 that are suitably connected with the header 60. A lever arm 75 is loosely connected also to the shaft 64 and is arranged adjacent to one or the other of the shifter rods 28 or 30 and it has a guide bar impelling spring 76 connected therewith and suitably tensioned on the arm 72 to normally press down a cross-bar 77 that is fixed to the arm 75 and extends across the tops of the shifter rods to be forced into notches 78 at suitable points in the tops of the shifter rods. The hub of the arm 75 has a tooth 80 thereon to engage a tooth 81 provided on the hub of the arm 72 enabling the spring 76 to permit retraction or release of the inner guide ring when the cross-bar drops into the notches in the shifter rods, the inner guide ring being under control of the shifter rods which force the cross-bar 77 out of the notches upon longitudinal movement of the rods. In the preferred arrangement of parts the spring 76 is coiled about the hub of one of the arms and connected at one end of the lever 75, its opposite end being connected with the shifter fork arm 72 and so tensioned as to force the arm 75 down upon the shifter rods and at the same time force the header 60 towards the web 39 to effect operation of the inner guide ring when the lever arm 75 is not in the notch but is upon the tops of the rods, the spring 76 being sufficiently strong to overcome the action of the springs 63 which usually hold the inner guide ring out of action. The result of the operation of the structure described is that the outer guide ring is normally held in operative position by the springs 59 and causes the spring clutch device 42 to drive the car forward when the invention is applied to a motor-vehicle. The clutch will automatically release by rotation when the car speed becomes faster than the speed of the engine drive, but this occurs only when the gear box is in high speed position. The driving clutch is released when the engine clutch is released, because of the operation of the lever arm 67 and other connections, and although the inner guide ring is normally held from action by the springs 63 it is brought into action when the gear box is shifted to second, low, and reverse, or to neutral position. There are two notches 78 in the rod 28, one notch being positioned to receive the cross-bar when the rod is set for high speed, the other notch receiving the cross-bar when the rod is in neutral position. The rod 30 has only a single notch 79 to receive the cross-bar when the rod is in reverse position and therefore both guide rings release with release of the engine clutch; when the engine clutch is in operation the outer guide ring is constantly in action but does not cause driving in reverse direction; the inner guide ring is out of operation in high gear but is in action when the gear box is set for second and low speed and for reverse motion.

In practical use, a motor-vehicle to which the invention is applied in connection with a transmission gear set as described, is operated in a simple manner, the invention automatically performing its functions. When driving forward the mechanism rotates in the direction of the arrows thereon, the clutch device 42 being operated into contact with the clutch member 37 whereby the shaft section 16 is rotated with the transmission shaft; unclutching immediately occurs when the speed of the shaft section 16 exceeds that of the transmission shaft which results from momentum or on descending grades when the engine fuel is decreased so that the engine merely runs idly. When the speed of the motor-vehicle decreases and operation of the engine is necessary for propulsion the clutching action automatically takes place so as to drive the car under power. Longitudinal movement of the shifter rods forces the cross-bar 77 out of the notches and upon the tops of the rods so as to operate the lever 75 to enable the spring 76 to move the arm 72 to effect operation of the inner guide ring as the gear 26 is shifted to reverse position and the clutch device 42 being in engagement with the clutch member 35, the shaft section 16 is driven with the transmission shaft in reverse direction so as to cause backward movement of the motor-vehicle. The guide rings 45 and 46, the headers 56 and 60 and the associated parts silently rotate with the transmission shaft and the annular clutch members 35 and 37, so that no wear due to friction occurs in operation.

What is claimed is:

1. A two-way clutch mechanism having two opposite rotary clutch members, a rotary shaft section, an operable clutch device secured to the shaft section and mainly arranged loosely between the clutch members, a clutch control device adjustably guided between the clutch members and connected with the clutch device to force the device reversibly to contact alternatively with the clutch members, and two series of clutch-actuating devices having independent controlling connections with the clutch control device.

2. A clutch mechanism having two opposite rotary driving clutch members, a rotary shaft head, a changeable clutch device arranged between the clutch members and secured to the shaft head, means co-operating with one of the clutch members to change the clutch device to clutch the member for rotating the shaft head in one direction, and means co-operating with the remaining one of the clutch members to change the clutch device to clutch the member for rotating the shaft head in the opposite direction upon reverse movement of the clutch member said means cooperating with said clutch members being independent of each other whereby one may be actuated without affecting the other.

3. A clutch mechanism having two annular clutch members concentrically spaced apart and a rotary shaft supporting the members, a rotary shaft section, and an operable coil spring clutch device secured to the shaft section and extending into space between the clutch members, the clutch device being provided with independent outer and inner clutch-action operating and controlling means movably guided between the clutch members and operatively connected with the clutch device to force the device into engagement with one or the other of the clutch members in relatively opposite clutching arrangement with the members respectively.

4. A clutch mechanism having a rotary annular clutch member, a rotary shaft section, a controlling spring clutch device secured to the shaft section and extending approximately to the clutch member to be forced thereto, the device being diametrically adjustable, a control ring concentric with the clutch member and having controlling connection with the clutch device for adjustment thereof relatively to the clutch member, the ring having inclined recesses, a retainer ring having clutch balls guided therein to operate in said recesses respectively, a guide ring movably guided and having an inclined face to force the balls into said recesses, and controlling means having controlling connection with the guide ring.

5. A clutch mechanism having a rotary transmission shaft, a rotary shaft section, an annular inner clutch member secured to the transmission shaft, an annular web secured to the inner clutch member, an annular outer clutch member secured to the web, there being a chamber adjacent to the web between the clutch members, a controllable clutch device secured to the shaft section and extending between the clutch members to co-act alternatively therewith, a control ring guided in said chamber and having controlling connection with the clutch device, an outer series and an inner series of clutch control devices operating in said chamber in co-operation with the control ring, each series being provided with a header and also springs for control thereof, and shifter forks for controlling the headers.

6. A unitary reversing clutch mechanism including a reversible rotary transmission shaft having a plurality of annular clutch members concentrically secured thereto, a rotary shaft section having a head adjacent to the clutch members, a coil spring clutch device loosely arranged between the clutch members and secured at one end to said head, a clutch control ring movably guided between the clutch members and having controlling connection with the opposite end of the clutch device, the control ring having oppositely inclined recesses in the outer and inner sides thereof respectively and clutch balls in the recesses respectively, a plurality of guide rings guiding the balls to control them in the recesses, and means controllably co-operating to control the guide rings.

7. A clutch mechanism including a reversibly driven rotary transmission shaft and a plurality of annular friction clutch members concentrically fixed thereto with a chamber between the members, a rotary shaft section having a head end adjacent to the clutch members, a controllable main clutch device loosely arranged between the clutch members and having one end secured to the head end of the shaft section to reversibly rotate the section, a clutch control device movably guided in said chamber and having controlling connection with the clutch device to force the device to clutch one or the other of the clutch members to be driven thereby, outer clutch controlling means co-operating with the clutch control device to control the operation of the main clutch device with respect to the outer one of the clutch members, and inner clutch controlling means co-operating with the clutch control device to control the operation of the main clutch device with respect to the inner one of the clutch members.

8. In clutch mechanism, the combination of a single two-way clutch device operable in opposite directions, two guide rings for the clutch device, each ring being provided with an independent control header.

9. In clutch mechanism, the combination of a rotary shaft section having a head provided with a center-bore and an annular channel about the center-bore, a transmission shaft having a journal-bearing in said center-bore and also two concentric clutch members extending to said head, and a coil spring clutch device secured at one end to said head in said channel and extending into space between said clutch members, the opposite end of the clutch device being provided with two-way controlling means cooperating with said clutch members to reversibly operate the clutch device relatively to the members.

10. In clutch mechanism, the combination with a rotary transmission shaft and a shaft section, of a web secured to the transmission shaft, an annular clutch member having fixed connection with the web, a diametrically adjustable clutch device secured to the shaft section to be adjusted to co-act with the clutch member, an annular header movably arranged opposite to the web and having rods secured thereto and guided by the web, a shifter fork having controlling connection with the header, a controller guide ring secured to said rods, and control apparatus controlled by said ring and having controlling connection with the clutch device to adjust the device for clutching action in one direction of rotation of the transmission shaft.

11. In combination with two aligned clutch members formed to provide radially spaced pairs of inner and outer, annular clutch surfaces and a clutch spring disposed between said pairs of clutch surfaces and operable to frictionally engage either pair of surfaces to operatively connect said clutch members together solely through the gripping action of the spring upon the respective pair of clutch surfaces and manually operable means for selectively causing said spring to initially grip against one or the other of said annular clutch surfaces.

12. In combination with two aligned clutch members formed to provide radially spaced pairs of inner and outer, annular clutch surfaces, and a clutch spring disposed between said pairs of clutch surfaces and means operable to expand or to contract the spring into frictional engagement with either the outer or the inner pair of clutch surfaces to operatively connect said clutch members together solely through the gripping action of the spring upon the respective pairs of clutch surfaces and manually operable means for selectively causing said spring to initially grip against one or the other of said annular clutch surfaces.

13. In combination with two aligned clutch members formed to provide an annular clutch spring chamber having pairs of inner and outer clutch surfaces, and a clutch spring disposed in said chamber and operable to frictionally engage either the inner or the outer pair of annular surfaces of said chamber to operatively connect said clutch members together solely through the gripping action of said spring with the respective pair of clutch surfaces and manually operable means for selectively causing said spring to initially grip against one or the other of said annular clutch surfaces.

DALMAR TEMPLETON BROWNLEE.